United States Patent

Pierce et al.

(10) Patent No.: US 9,199,574 B2
(45) Date of Patent: Dec. 1, 2015

(54) SYSTEM AND METHOD FOR DETECTING A BLOCKED IMAGER

(71) Applicant: Gentex Corporation, Zeeland, MI (US)

(72) Inventors: Phillip R. Pierce, Grand Rapids, MI (US); David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 185 days.

(21) Appl. No.: 14/022,761

(22) Filed: Sep. 10, 2013

(65) Prior Publication Data

US 2014/0070698 A1 Mar. 13, 2014

Related U.S. Application Data

(60) Provisional application No. 61/699,473, filed on Sep. 11, 2012.

(51) Int. Cl.
*B60Q 1/00* (2006.01)
*B60Q 1/08* (2006.01)
*H04N 17/00* (2006.01)

(52) U.S. Cl.
CPC .............. *B60Q 1/085* (2013.01); *H04N 17/002* (2013.01)

(58) Field of Classification Search
CPC ............ B60Q 1/085; B60Q 1/08; B60Q 1/18; H04N 17/002
See application file for complete search history.

(56) References Cited

U.S. PATENT DOCUMENTS

| 5,631,638 | A | 5/1997 | Kaspar et al. | |
|---|---|---|---|---|
| 5,689,330 | A * | 11/1997 | Gerard et al. | 356/138 |
| 5,796,094 | A | 8/1998 | Schofield et al. | |
| 5,923,027 | A | 7/1999 | Stam et al. | |
| 6,293,686 | B1 * | 9/2001 | Hayami et al. | 362/465 |
| 6,495,815 | B1 | 12/2002 | Stam et al. | |
| 6,587,573 | B1 | 7/2003 | Stam et al. | |
| 6,853,897 | B2 | 2/2005 | Stam et al. | |

(Continued)

FOREIGN PATENT DOCUMENTS

| DE | 4322937 A1 | 1/1995 |
|---|---|---|
| DE | 19854964 A1 | 6/2000 |
| DE | 10060734 | 6/2002 |
| DE | 10104734 A1 | 8/2002 |

(Continued)

OTHER PUBLICATIONS

Patent Cooperation Treaty, International Searching Authority, International Search Report, Written Opinion of the International Searching Authority and Notification of Transmittal, Dec. 19, 2013 6 Pages.

*Primary Examiner* — Jung Kim
(74) *Attorney, Agent, or Firm* — Price Heneveld LLP; Scott P. Ryan

(57) ABSTRACT

An exterior light control system for controlling exterior lights of a controlled vehicle is provided, which includes an imager configured to image a scene external and forward of the controlled vehicle and to generate image data corresponding to the acquired images. A controller is configured to receive and analyze the image data and generate a control signal for controlling the exterior lights of the controlled vehicle. The controller is further configured to receive temperature information relating to an operational temperature of the imager, wherein when the controller determines that the operational temperature of the imager is below a temperature threshold, the control signal includes an indication that the imager is blocked.

19 Claims, 3 Drawing Sheets

(56) References Cited

U.S. PATENT DOCUMENTS

| | | |
|---|---|---|
| 6,861,809 B2 | 3/2005 | Stam |
| 7,019,275 B2 | 3/2006 | Stam et al. |
| 7,310,190 B2 | 12/2007 | Fox |
| 7,485,844 B2 | 2/2009 | Stam et al. |
| 7,565,006 B2 | 7/2009 | Stam et al. |
| 7,612,356 B2 | 11/2009 | Utida et al. |
| 7,731,373 B2 | 6/2010 | Oskarsson et al. |
| 7,900,464 B2 * | 3/2011 | Aoki et al. .................. 62/176.6 |
| 8,045,760 B2 | 10/2011 | Stam et al. |
| 8,090,153 B2 | 1/2012 | Schofield et al. |
| 8,376,595 B2 | 2/2013 | Higgins-Luthman |
| 8,442,699 B2 | 5/2013 | Takamatsu et al. |
| 2003/0107323 A1* | 6/2003 | Stam ............................... 315/82 |
| 2004/0027834 A1* | 2/2004 | Chigusa et al. ............... 362/511 |
| 2007/0031006 A1 | 2/2007 | Leleve et al. |
| 2007/0102214 A1 | 5/2007 | Wittorf et al. |
| 2008/0024606 A1 | 1/2008 | Kawasaki |
| 2008/0101077 A1 | 5/2008 | Watanabe |
| 2011/0280026 A1* | 11/2011 | Higgins-Luthman ......... 362/466 |

FOREIGN PATENT DOCUMENTS

| | | |
|---|---|---|
| DE | 102004013269 | 9/2005 |
| DE | 102006041857 A1 | 4/2007 |
| DE | 102007034657 A1 | 1/2008 |
| DE | 102007051891 A1 | 6/2008 |
| EP | 1507138 A2 | 2/2005 |
| EP | 1515293 | 3/2005 |
| EP | 1617371 | 1/2006 |
| EP | 1715456 A1 | 10/2006 |
| EP | 2026247 A2 | 2/2009 |
| EP | 2281719 | 2/2011 |
| GB | 2242018 A | 9/1991 |
| GB | 2395390 A | 5/2004 |
| JP | 2008207738 A | 9/2008 |
| RU | 2338653 | 11/2008 |
| RU | 2381629 | 2/2010 |
| WO | 0204247 A1 | 1/2002 |
| WO | 03093857 A2 | 11/2003 |
| WO | WO2004019601 | 3/2004 |
| WO | WO2008025436 | 3/2008 |
| WO | 2011127895 A1 | 10/2011 |

* cited by examiner

SYSTEM AND METHOD FOR DETECTING A BLOCKED IMAGER

CROSS-REFERENCE TO RELATED APPLICATIONS

This application claims priority to and the benefit under 35 U.S.C. §119(e) of U.S. Provisional Patent Application No. 61/699,473, filed on Sep. 11, 2012, entitled "SYSTEM AND METHOD FOR CONTROLLING EXTERIOR VEHICLE LIGHTS RESPONSIVE TO SENSING ENVIRONMENTAL TEMPERATURE," the entire disclosures of which is hereby incorporated herein by reference.

FIELD OF THE INVENTION

The present invention generally relates to a system and method for controlling exterior lights of a controlled vehicle, and more particularly, to a system and method for controlling exterior lights of a controlled vehicle in response to a blocked imager condition.

BACKGROUND OF THE INVENTION

Auto High Beam (AHB) systems and alternate systems for controlling the light beam illumination in front of a motor vehicle have become desired features in vehicles and generally function to maximize the use of high beams at night by identifying oncoming and preceding vehicles and automatically controlling the high beam lighting pattern. Prior systems are known for controlling exterior vehicle lights in response to images captured forward of the vehicle by an imager such as a camera. In some instances, the imager's field of view may become blocked by obstructions such as snow, fog, dirt, frost, or condensation. Thus, for these systems to be effective, it is crucial to be able to identify when an imager becomes blocked and quickly remedy the situation. While some prior systems may already employ methods for identifying and eliminating a blocked imager condition, it is desired to provide an additional method for detecting a blocked imager condition, which may be used to supplement, or in place of, existing methods.

SUMMARY OF THE INVENTION

One aspect of the present invention includes an exterior light control system for controlling exterior lights of a controlled vehicle. The system includes an imager configured to image a scene external and forward of the controlled vehicle and to generate image data corresponding to the acquired images. The system also includes a controller configured to receive and analyze the image data and generate a control signal for controlling the exterior lights of the controlled vehicle. The controller is further configured to receive temperature information relating to an operational temperature of the imager, wherein when the controller determines that the operational temperature of the imager is below a temperature threshold, the control signal includes an indication that the imager is blocked.

Another aspect of the present invention includes an exterior light control system for controlling exterior lights of a controlled vehicle. The system includes an imager provided proximate a vehicle windshield and having an image sensor configured to image a scene through a viewing area of the vehicle windshield and to generate image data corresponding to the acquired images, wherein the scene is external and forward of the controlled vehicle. The system also includes a heating element operable to perform at least one of a defogging and a defrosting function on the viewing area of the vehicle windshield. The system further includes a controller configured to receive and analyze the image data and generate a control signal that is used to control exterior lights. The controller is further configured to receive information relating to the operational temperature of the imager, wherein when the controller determines that the operational temperature of the imager is below a temperature threshold, the control signal includes an indication that the imager is blocked and the heating element is activated.

Yet another aspect of the present invention includes a method for controlling exterior lights of a controlled vehicle. The method includes the steps of: imaging a scene external and forward of the controlled vehicle with an imager to generate image data corresponding to the acquired images; receiving and analyzing the image data with a controller and generating a control signal that is used to control exterior lights; receiving temperature information relating to an operational temperature of the imager and determining if the operational temperature is below a temperature threshold; and including a blocked imager indication in the control signal if the operational temperature of the imager is below the temperature threshold.

These and other features, advantages, and objects of the present invention will be further understood and appreciated by those skilled in the art by reference to the following specification, claims, and appended drawings.

DETAILED DESCRIPTION OF EMBODIMENTS

Figure 2:
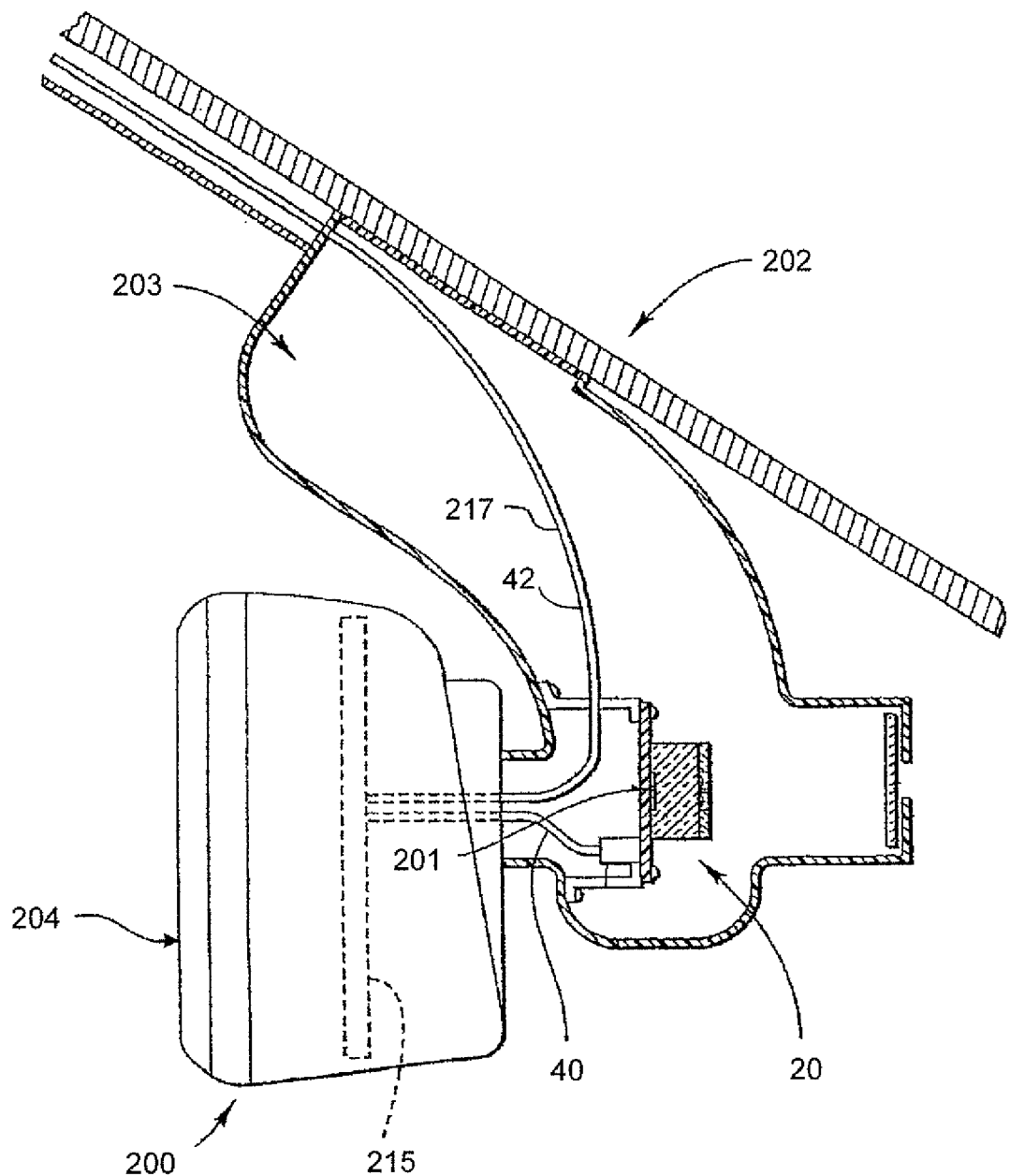
FIG. 2 is a partial side cross-sectional elevational view of a rearview assembly incorporating an exterior light control system according to another embodiment of the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to other components for purposes of emphasis and understanding.

The embodiments described herein relate to an exterior light control system for controlling exterior lights of a controlled vehicle in response to image data acquired from an imager's image sensor, which captures images forward of the vehicle. Prior art systems are known for controlling exterior vehicle lights in response to images captured forward of the vehicle. In these prior art systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some other than a low beam state). If a vehicle was present in the glare area, the controller would respond by changing the state of the exterior lights so as to not cause glare for other driver(s). Examples of such systems are described in U.S. Pat. Nos. 5,837,994; 5,990,469; 6,008,486; 6,049,171; 6,130,421; 6,130,448; 6,166,698; 6,379,013; 6,403,942; 6,587,573; 6,611,610; 6,631,316; 6,774,988; 6,861,809; 7,321,112; 7,417,221; 7,565,006; 7,567,291; 7,653,215; 7,683,326; 7,881,839; 8,045,760; and 8,120,652, the entire disclosures of which are incorporated herein by reference.

In some of the prior art systems, the controller would analyze the captured images, to detect an obstruction such as snow or fog, or some other obstruction such as dirt, frost, or condensation on the windshield or lens of the image sensor. The controller would then typically either place the exterior lights in low beam state or otherwise inhibit operation of high beam state based on a detected foggy condition, a heavy snow condition, or other kinds of conditions implying the sensor is blocked. In addition, the controller may automatically adjust vehicle front and rear fog lights based on the detection of the foggy condition. Examples of such systems are described in U.S. Pat. Nos. 6,587,573 and 8,045,760, the entire disclosures of which are incorporated herein by reference.

By not only identifying a blocked imager, but by also sensing operational temperature of the imager, the current system advantageously provides more flexibility in how the exterior lights are controlled in a variety of environments. For purposes of this disclosure, operational temperature is defined herein as the temperature at which the imager operates and may include a temperature range that varies depending on factors such as, but not limited to, environmental temperature and self-heating during device operation. The environmental temperature includes the temperature inside the vehicle, which may be similar or different to the temperature outside of the vehicle. Generally speaking, the operational temperature of the imager will tend to increase with increasing environmental temperature and decrease with decreasing environmental temperature. However, there are instances where the operational temperature of the imager will differ from the environment temperature. As a result, use of the operational temperature of the imager may offer advantages over using environmental temperatures. For example, the operational temperature of an imager may remain elevated on cold days where the vehicle has recently been driven such that a heating element (i.e. defroster) has already cleared the windshield area in front of the imager. Given this, there may be instances where the operational temperature of the imager can be used in recommending whether to place the exterior lights in a low beam or high beam state. As will be later described herein, when the sensed operational temperature does not exceed a certain temperature threshold, it may be desirable to place the exterior lights in a low beam state or otherwise inhibit operation of automatic (and optionally manual) control of the high beam headlamps, whereas when the sensed operational temperature does exceed the temperature threshold, it may be desirable to allow operation of exterior lights in various states in addition to low beam because the imager may be less likely to be substantially and/or severely obstructed by frost/snow or fog at higher operational temperatures, which are typically associated with higher environmental temperatures. It should be noted that the temperature threshold is not limited to any specific operational temperature and may include operational temperatures associated with environmental temperatures near and/or above freezing (0 degrees Celsius). It should also be noted that the operational temperature of an imager may be sensed in numerous ways, as will be obvious to those having ordinary skill in the art. Thus, while a few methods for measuring the operational temperature of an imager are described later herein, it is to be understood that other suitable methods may be similarly implemented without departing from the teachings provided herein. Furthermore, it should be appreciated that the present invention is not limited to the specific manner by which a vehicle manufacturer chooses to respond to the indication of an operational temperature threshold or a blocked imager. However, by providing this information, the current system allows the vehicle manufacturers flexibility in how they choose to have an exterior light control respond to different types of detected temperature information or blocked imager conditions.

Figure 1:
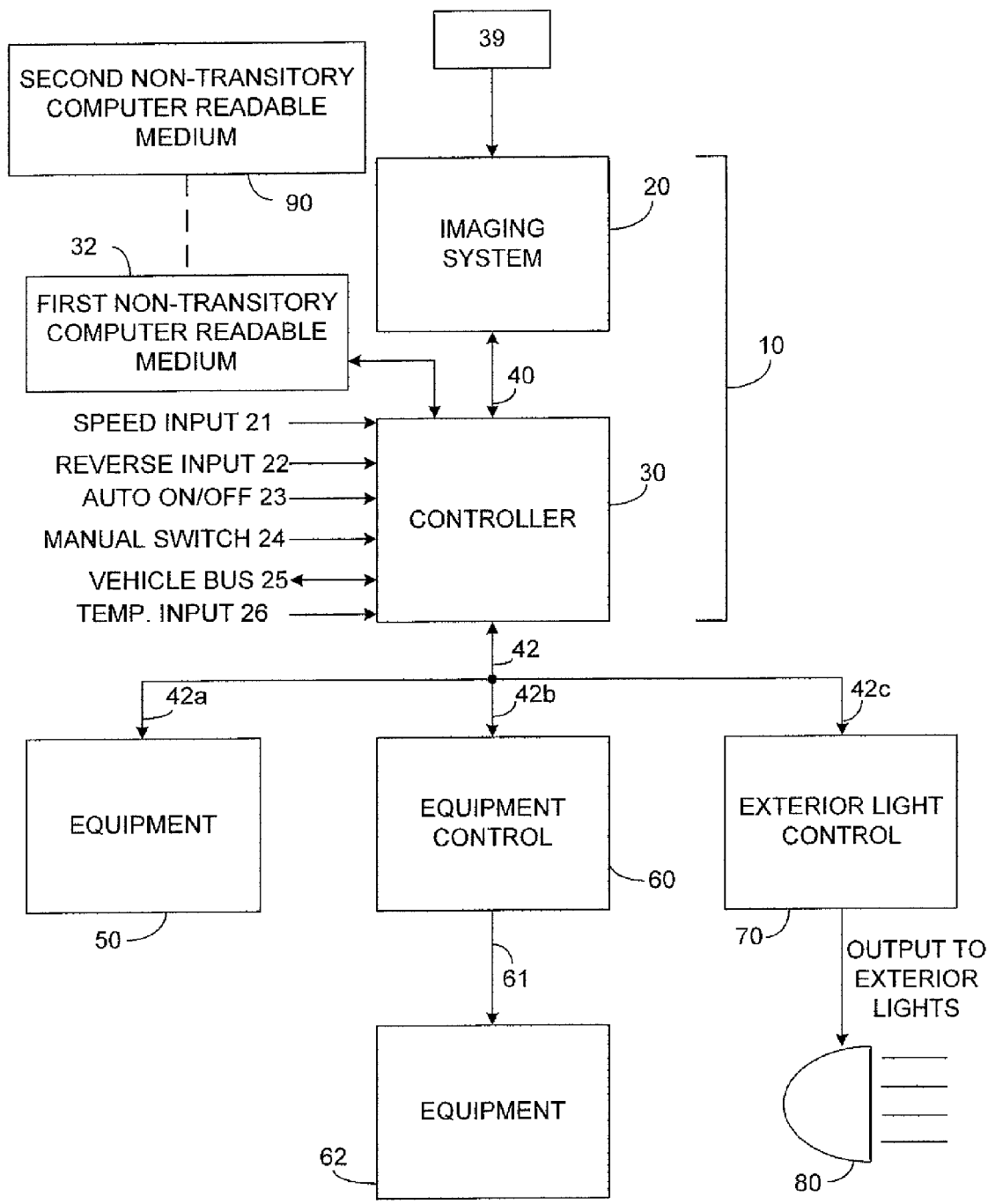
FIG. 1 is a block diagram of an exterior light control system constructed according to one embodiment of the present invention.

A first embodiment of a system 10 is shown in FIG. 1. A system 10 is provided for controlling equipment 50, 62, 80 of a controlled vehicle. The system 10 includes an imager 20 and a controller 30. The Imager 20 includes an image sensor 201 (FIG. 2) that is configured to image a scene external of the controlled vehicle and to generate image data corresponding to the acquired images. The controller 30 receives and analyzes the image data and generates a control signal that is used to control the equipment 50, 62, 80. The control signal is generated in response to analysis of the image data.

The controller 30 may be configured to directly connect to the equipment 50 being controlled such that the generated control signals directly control the equipment. Alternatively, the controller 30 may be configured to connect to an equipment control 60 or an exterior light control 70, which, in turn, are connected to the equipment 62, 80 being controlled such that the control signals generated by the controller 30 only indirectly control the equipment. For example, in the case of the equipment being exterior lights 80, the controller 30 may analyze the image data from the imager 20 so as to generate control signals that are more of a recommendation for the exterior light control 70 to use when controlling the exterior lights 80. The control signals may further include not just a recommendation, but also a code representing a reason for the recommendation so that the exterior light control 70 may determine whether or not to override a recommendation. Further, as described in detail below, the control signal may include an indication of a blocked imager condition. Such an indication is particularly useful when the exterior light control 70 is separate from the controller 30 and performs the direct control of the exterior lights 80.

By providing a blocked imager indication, the controller 30 provides additional information to the exterior light control 70 and/or the equipment control 60. This allows the vehicle manufacturer more flexibility in how they choose to respond to an assertion of the blocked imager detection indication or the removal of this indication. Examples of which are to disable automatic high beam lighting control if the control signal indicates the imager is blocked, enabling automatic (and optionally manual) high beam lighting control if the control signal no longer includes the blocked imager indication, delaying enabling of automatic high beam lighting control if the control signal no longer includes the blocked imager indication.

The present system improves upon the above-mentioned exterior light control systems by providing a system that allows auto manufacturers to respond to the assertion or removal of the blocked imager indication in a manner of their choosing. This also allows one common system to be used for all manufacturers regardless of whether they wish to change or maintain a particular exterior light control pattern in response to such an indication. Further, different features of equipment control may be enabled or disabled based upon the detection of a blocked imager condition.

As shown in FIG. 1, various inputs, such as inputs 21, 22, 23, 24, may be provided to the controller 30 that may be taken into account in forming a recommendation or direct control signal. In some cases, such inputs may instead be provided to the equipment control 60 and the exterior light control 70. For example, input from manual switches may be provided to the equipment control 60 and the exterior light control 70, which may allow the equipment control 60 and the exterior light control 70 to override a recommendation from the controller 30. It will be appreciated that various levels of interaction and cooperation between the controller 30 and the equipment control 60 and the exterior light control 70 may exist. One reason for separating the control functions is to allow the imager 20 to be disposed in the best location in the vehicle for obtaining images, which may be a distance from the equipment to be controlled and to allow communication over a vehicle bus 25.

According to one embodiment, the equipment that the system 10 controls may include one or more exterior lights 80 and a control signal generated by the controller 30 may be an exterior light control signal. In this embodiment, the exterior lights 80 may be controlled directly by the controller 30 or by the exterior light control 70, which receives a control signal from the controller 30. As used herein, the term "exterior lights" broadly includes any exterior lighting on the vehicle. Such exterior lights may include headlamps (both low and high beam, if separate from one another), taillights, and foul weather lights, such as fog lights, brake lights, center high mount stop lights (CHMSLs), turn signals, back-up lights, etc. The exterior lights 80 may be operated in several different modes, including conventional low beam and high beam states. They may also be operated as daytime running lights, and additionally as super-bright high beams in those countries where they are permitted.

The brightness of the exterior lights 80 may also be continuously varied between the low, high, and super-high states. Separate lights may be provided for obtaining each of these exterior lighting states or the actual brightness of the exterior lights 80 may be varied to provide these different exterior lighting states. In either case, the perceived brightness, or illumination pattern, of the exterior lights 80 is varied. As used herein, the term "perceived brightness" means the brightness of the exterior lights 80 as perceived by an observer outside the vehicle. Most typically, such observers will be drivers or passengers in a preceding vehicle or in a vehicle traveling along the same street in the opposite direction. Ideally, the exterior lights 80 are controlled such that if an observer is located in a vehicle within a glare area relative to the vehicle (i.e., the area in which the observer would perceive the brightness of the exterior lights 80 as causing excessive glare), the beam illumination pattern is varied such that the observer is no longer in the glare area. The perceived brightness and/or glare area of the exterior lights 80 may be varied by changing the illumination output of one or more of the exterior lights 80, by steering one or more lights to change the aim of one or more of the exterior lights 80, selectively blocking or otherwise activating or deactivating some or all of the exterior lights 80, altering the illumination pattern forward of the vehicle, or a combination of the above.

The imager 20 may be any conventional system. Examples of suitable imagers are disclosed in published U.S. Patent Application Publication Nos. 20080192132 and 20120072080, and in U.S. Provisional Application Nos. 61/500,418, entitled "MEDIAN FILTER," filed on Jun. 23, 2011, by Jon H. Bechtel et al.; 61/544,315, entitled "MEDIAN FILTER," filed on Oct. 7, 2011, by Jon H. Bechtel et al.; and 61/556,864, entitled "HIGH DYNAMIC RANGE CAMERA LOW LIGHT LEVEL FILTERING," filed on Nov. 8, 2011, by Jon H. Bechtel et al., the entire disclosures of which are incorporated herein by reference.

The imager 20 includes an image sensor (or camera) 201 (FIG. 2) to capture images that may then be displayed and/or analyzed in order to control vehicle equipment in addition to exterior lights. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Patent Nos. 5,837,994; 5,990,469; 6,008,486; 6,049,171; 6,130,421; 6,130,448; 6,166,698; 6,379,013; 6,403,942; 6,587,573; 6,611,610; 6,631,316; 6,774,988; 6,861,809; 7,321,112; 7,417,221; 7,565,006; 7,567,291; 7,653,215; 7,683,326; 7,881,839; 8,045,760; and 8,120,652, and in U.S. Provisional Application Nos. 61/512,213, entitled "RAISED LANE MARKER DETECTION SYSTEM AND METHOD THEREOF," filed on Jul. 27, 2011, by Brock R. Rycenga et al., and 61/512,158, entitled "COLLISION WARNING SYSTEM AND METHOD THEREOF," filed on Jul. 27, 2011, by Brock R. Rycenga et al., the entire disclosures of which are incorporated herein by reference.

In the example shown in FIG. 1, the imager 20 also includes a temperature sensor 39 operably coupled to the imager 20 and configured to determine the operational temperature of the imager 20. In one embodiment, the temperature sensor 39 is a thermocouple device such as a diode, whereby the operational temperature of the imager 20 is determined by measuring a voltage change across the diode. In another embodiment, the temperature sensor 39 is a resistive temperature device such as a thermistor, whereby the operational temperature of the imager 20 is determined by measuring a change in resistance across the thermistor. Alternatively, or additionally, the operating temperature of the imager 20 may be determined using pixel data from the image sensor 201. In any event, these are just a few ways in which the operational temperature of the imager 20 may be determined and obvious variants may be similarly used instead or in conjunction with any of the aforementioned methods.

In one embodiment, the imager 20 may be controlled by the controller 30 and communication of the sensed operational temperature may be communicated to the controller 30 over a communication bus 40. Other imager parameters, as well as image data may also occur over the communication bus 40, which may be a bi-directional serial bus, a parallel bus, a combination of both, or other suitable means. The controller 30 serves to perform equipment control functions by analyzing images from the imager 20, determining an equipment (or exterior light) state based upon information detected within those images, and communicating the determined equipment (or exterior light) state to the equipment 50, the equipment control 60, or the exterior light control 70 through a bus 42, which may be the vehicle bus 25, a CAN bus, a LIN bus, or any other suitable communication link. The controller 30 may control the imager 20 to be activated in several different modes with different exposure times and different readout windows. The controller 30 may be used to both perform the equipment or exterior light control function and control the parameters of the imager 20.

The controller 30 can also take advantage of the availability of signals (such as vehicle speed and yaw) communicated via discrete connections or over the vehicle bus 25 in making decisions regarding the operation of the exterior lights 80. In particular, a speed input 21 provides vehicle speed information to the controller 30 from which speed can be a factor in determining the control state for the exterior lights 80 or other equipment. A reverse signal 22 informs the controller 30 that the vehicle is in reverse, responsive to which the controller 30 may clear an electrochromic mirror element regardless of signals output from light sensors. An auto ON/OFF switch input 23 is connected to a switch having two states to dictate to the controller 30 whether the vehicle exterior lights 80 should be automatically or manually controlled. An auto ON/OFF switch (not shown) connected to the ON/OFF switch input 23 may be incorporated with the headlamp switches that are traditionally mounted on the vehicle dashboard or incorporated into steering wheel column levels. A manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, can optionally be provided through the vehicle bus 25 shown in FIG. 1. Alternatively, these inputs 21, 22, 23, 24 may be provided to the equipment control 60 or the exterior light control 70.

The controller 30 can control, at least in part, other equipment 50 within the vehicle which is connected to the controller 30 via the vehicle bus 42. Specifically, the following are some examples of one or more equipment 50 that may be controlled by the controller 30: the exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system, such as a digital signal processor-based voice actuation system, a vehicle speed control, interior lights, rearview mirrors, an audio system, an engine control system, and various other switches and other display devices that may be located throughout the vehicle.

In addition, the controller 30 may be, at least in part, located within a rearview assembly of a vehicle or located elsewhere within the vehicle. The controller 30 may also use a second controller (or controllers), equipment control 60, which may be located in a rearview assembly or elsewhere in the vehicle in order to control certain kinds of equipment 62. The equipment control 60 can be connected to receive via the vehicle bus 42 control signals generated by the controller 30. The equipment control 60 subsequently communicates and controls the equipment 62 via a bus 61. For example, the equipment control 60 may be a windshield wiper control unit that controls windshield wiper equipment, turning this equipment ON or OFF. The equipment control 60 may also be an electrochromic mirror control unit in which the controller 30 is programmed to communicate with the electrochromic mirror control unit in order for the electrochromic mirror control unit to change the reflectivity of the electrochromic mirror(s) in response to information obtained from an ambient light sensor, a glare sensor, as well as any other components coupled to the processor. Specifically, the equipment control unit 60 in communication with the controller 30 may control the following equipment: the exterior lights 80, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system, such as a digital signal processor-based voice actuation system, a vehicle speed, interior lights, rearview mirrors, an audio system, a climate control, an engine control, and various other switches and other display devices that may be located throughout the vehicle.

Portions of the system 10 can be advantageously integrated into a rearview assembly 200, as illustrated in FIG. 2, wherein the imager 20 is integrated into a mount 203 of the rearview assembly 200. This location provides an unobstructed forward view through a region of a windshield 202 of the vehicle that is typically cleaned by the windshield wipers of the vehicle (not shown). Additionally, mounting an image sensor 201 of the imager 20 in the rearview assembly 200 permits sharing of circuitry, such as a power supply, a microcontroller, and light sensors.

Referring to FIG. 2, the image sensor 201 is mounted within the mount 203, which is mounted to the vehicle windshield 202. The mount 203 provides an opaque enclosure for the image sensor 201 with the exception of an aperture through which light is received from a forward external scene. According to one embodiment, equipment 50 (FIG. 1) is a heating element configured to defog and/or defrost a viewing area of the windshield that is proximate to the imager 20 and through which the imager 20 views the external scene. Optionally, the heating element may be disposed proximate the image sensor 201 and configured to defog and/or defrost the image sensor 201. It is to be understood, however, that the heating element is not limited to any specific location or construction. Further, it is contemplated that more than one heating element may be used and controlled by the controller 30. Further still, it is contemplated that the controller 30 may control the ON/OFF state of the heating element(s) via a temperature input 26, the speed input 21, and/or other inputs.

According to one embodiment, the speed input 21 may be used to control the heating element. For certain hybrid and non-hybrid vehicles, where the engine turns OFF when the vehicle is not moving, a speed threshold may be implemented such that the heating element is turned OFF when the vehicle is travelling below the speed threshold. In this manner, the heating element does not draw power from the vehicle battery when the engine is turned off, thus enabling more power to be supplied to higher priority systems and/or vehicle devices. Once the engine is turned back ON and the vehicle speed exceeds the speed threshold, the heating element may again resume normal operation.

The controller 30 of FIG. 1 may be provided on a main circuit board 215 and mounted in a rearview housing 204, as shown in FIG. 2. As discussed above, the controller 30 may be connected to the imager 20 by a bus 40 or other means. The main circuit board 215 may be mounted within the rearview housing 204 by conventional means. Power and a communication link 42 with a vehicle electrical system, including the exterior lights 80 (FIG. 1), are provided via a vehicle wiring harness 217 (FIG. 2).

The rearview assembly 200 may include a mirror element or a display that displays a rearward view. The mirror element may be a prismatic element or an electro-optic element, such as an electrochromic element.

Additional details of the manner by which system 10 may integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The method for controlling exterior lights of a controlled vehicle will now be described with reference to FIG. 3. This method is described below as being implemented by the controller 30 using image data received from the imager 20 and the temperature sensor 39. This method may be a subroutine executed by any processor, and thus, this method may be embodied in a non-transitory computer-readable medium having stored thereon, software instructions that when executed by a processor, cause the processor to control the equipment of the controlled vehicle by executing the steps of the method described below. In other words, aspects of the inventive method may be achieved by software stored on a non-transitory computer-readable medium or software modifications or updates to existing software residing in a non-transitory computer-readable medium. Such software or software updates may be downloaded into a first non-transitory computer-readable media 32 of the controller 30 (or locally associated with the controller 30 or some other processor) typically prior to being installed in a vehicle, from a second non-transitory computer-readable media 90 located remote from the first non-transitory computer-readable media 32. The second non-transitory computer-readable media 90 may be in communication with first non-transitory computer-readable media 32 by any suitable means, which may at least partially include the Internet or a local or wide area wired or wireless network.

Figure 3:
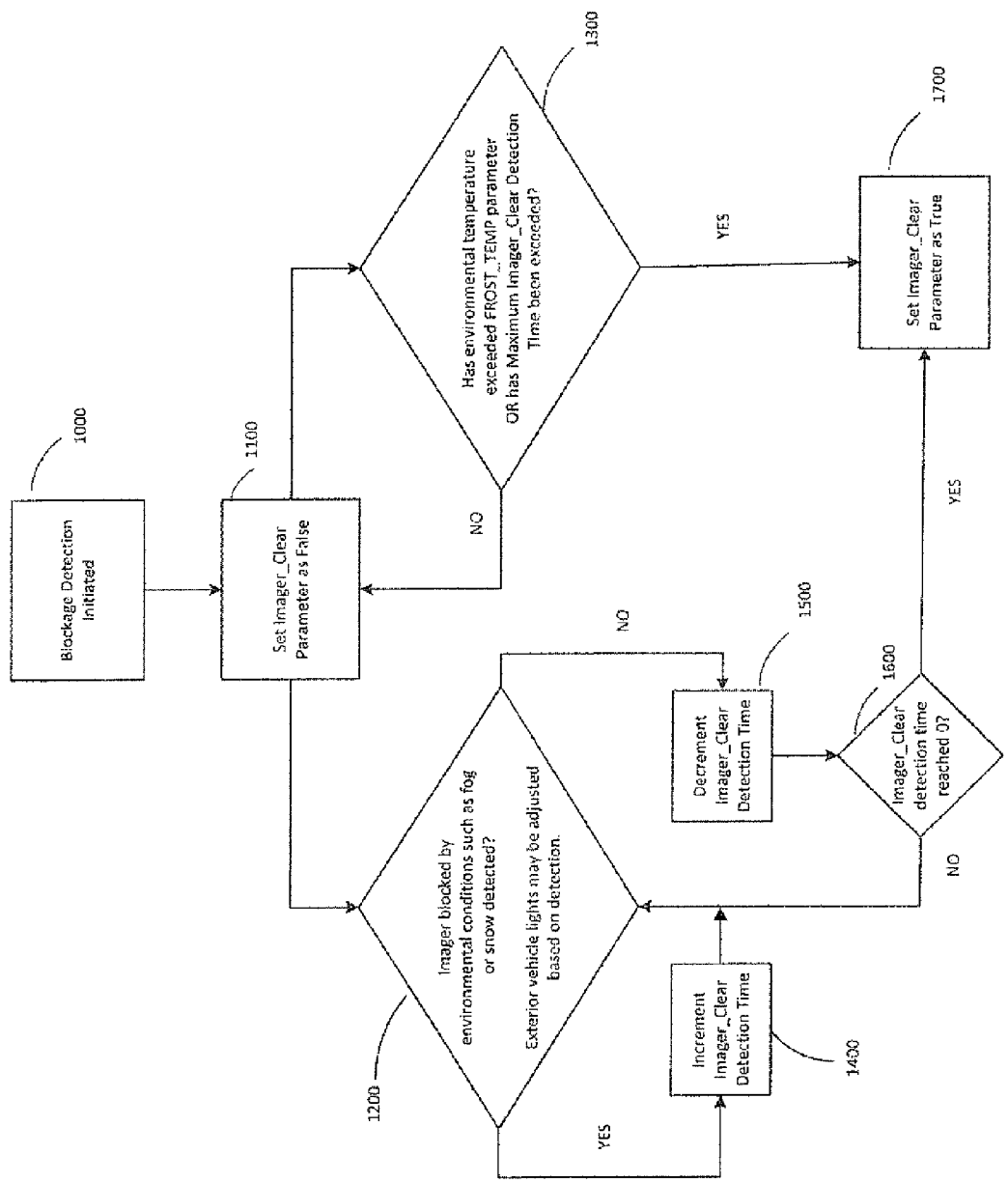
FIG. 3 is a flow chart illustrating a routine for detecting a blocked imager of the present invention.

FIG. 3 shows a general flow chart illustrating various steps to be executed by the controller 30. As shown in FIG. 3, the method may begin with step 1000 in which the controller 30 initiates the blockage detection routine. The blockage detection may be initiated by turning ON the image system 10 and detecting that it is ready to receive and analyze image data, which may occur when the vehicle ignition is turned ON. In step 1100, the controller 30 may set an Imager_Clear Parameter as FALSE as an initial premise in order to begin testing whether the imager is blocked. Thus, the controller 30 initially transmits a control signal that includes a blocked imager indication, which may be used to control the exterior lights of the controlled vehicle, an example of which is to disable automatic high beam lighting control or otherwise place the exterior lights in a low beam state.

Next, the controller 30 advances to steps 1200 and 1300, computing both steps in parallel. In step 1200, controller 30 determines whether the imager 20 is considered blocked due fog, snow, or other kinds of obstructions that may obstruct the view of the imager 20. In addition to adversely affecting the system 10 described herein, the presence of obstructions may also be problematic to other systems that rely on the imager 20, such as, but not limited to, a lane detection system. For example, if the imager 20 is in a blocked condition, the imager 20 may have difficulty clearly detecting lane lines and bright spots during daytime and nighttime driving. Details of how to detect the aforementioned obstructions are disclosed in commonly-assigned U.S. Pat. Nos. 6,587,573 and 8,045,760, the entire disclosures of which are incorporated herein by reference.

If the imager 20 is detected as blocked, the controller 30 advances to step 1400 and increments an Imager_Clear detection time by a predetermined amount, thereby increasing the previous processing time provided to continue determining whether the imager 20 is blocked and to remedy the blocked condition with defogging and/or defrosting techniques. One such technique includes turning ON the previously mentioned heating element to provide defogging and/or defrosting to the surrounding windshield area and/or image sensor 201. Other details of how to defog and/or defrost a blocked imager are disclosed in commonly assigned U.S. Pat. No. 7,485,844, the entire disclosure of which is incorporated by reference.

After step 1400, the controller returns back to step 1200. If the imager 20 is detected as unblocked in step 1200, the controller advances to step 1500 and decrements the previous processing time provided to continue detecting whether the imager 20 is blocked. The controller 30 proceeds to step 1600 to determine if the processing time for detecting the blocked imager 20 has been elapsed without detection of a blocked imager 20. If so, the controller 30 then proceeds to step 1700 and sets an Imager_Clear Parameter as True, thereby transmitting a control signal that includes an indication that the imager 20 is not blocked. The control signal may then be used to enable automatic (and optionally manual) high beam lighting control. Subsequently, defogging and/or defrosting devices such as the previously described heating element may be turned OFF since the imager 20 will now have a clear field of view. If the processing time for detecting the blocked imager 20 has not been elapsed without detection of a blocked imager 20, the controller returns to step 1200.

As further shown in FIG. 3, the controller 30 operates step 1300 in parallel with step 1200 such that, in step 1300, the controller receives information relating to the operational temperature of the imager 20. As previously mentioned, this temperature information may be sensed via the temperature sensor 39 in the imager 20. If, in step 1300, the controller 30 determines that the detected operational temperature of the imager 20 exceeds a FROST_TEMP parameter, the controller 30 advances to step 1700 and sets the Imager_Clear parameter as True, thereby transmitting a control signal indicating that the imager 20 is unblocked. Alternatively, if the detected operational temperature of the imager 20 does not exceed the FROST_TEMP parameter, the controller 30 returns to step 1100 and sets the Imager_Clear parameter as False, thereby transmitting a control signal that includes a blocked imager indication. As previously mentioned, the threshold temperature, or the FROST_TEMP parameter in this case, is not limited to any specific operation temperature and may include operational temperatures associated with environmental temperatures near and/or above freezing (0 degrees Celcius). Therefore, the satisfaction of step 1300 may automatically preempt any additional processing in step 1200. For example, the imager 20 may detect fog in step 1200, but if the operational temperature of the imager 20 detected by the controller 30 exceeds the FROST_TEMP parameter, the imager 20 will be deemed as unblocked. Allowing operational temperature to determine if the imager 20 is blocked may lower the degree of inaccurate detection of the blocked imager 20 because it may be less likely for the imager 20 to be substantially and/or severely obstructed by frost/snow or fog when the operational temperature is higher, which typically corresponds to higher environmental temperatures.

Similarly, if the controller 30 determines a Maximum Imager_Clear detection time has been exceeded during the processing of steps 1200 and 1400, the controller 30 will proceed from step 1300 to step 1700 and the imager 20 will be deemed unblocked. The imager 20 may be considered as unblocked (step 1700) after a predetermined maximum amount of time has been utilized to unblock (e.g., defogging and/or defrosting via the heating element and/or other devices) the detected blocked imager. Allowing a lapsing of a predetermined amount of detection time to determine if an imager is blocked may lower the degree of inaccurate detection of a blocked imager because most conditions that lead to a blocked imager can be remedied within a certain detection time frame.

Accordingly, an exterior light control system responsive to a blocked image condition has been advantageously described herein. The exterior light control system advantageously utilizes the operational temperature of an imager to determine the existence of a blocked imager condition, which enables the exterior lights of a controlled vehicle to be controlled according to different types of detected temperature information or blocked imager conditions.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A blocked imager detection system for use in a controlled vehicle, comprising:
   an imager configured to image a scene external and forward of the controlled vehicle and to generate image data corresponding to the acquired images; and
   a controller configured to receive temperature information relating to an operational temperature of the imager, wherein when the controller determines that the operational temperature of the imager is below a temperature threshold, the controller generates a signal having an indication that the imager is blocked.

2. The blocked imager detection system of claim 1, further comprising a temperature sensor for detecting the operational temperature of the imager.

3. The blocked imager detection system of claim 2, wherein the temperature sensor comprises at least one of a thermistor and a diode.

4. The blocked imager detection system of claim 1 wherein the imager comprises an image sensor and the operational temperature of the imager is determined using pixel data from the image sensor.

5. The blocked imager detection system of claim 1 wherein the signal provides a recommendation to an exterior light control system of a controlled vehicle.

6. The blocked imager detection system of claim 5 wherein the signal recommends disabling an automatic high beam control if the signal includes the indication that the imager is blocked.

7. The blocked imager detection system of claim 1, further comprising a heating element operable to perform at least one of a defogging and a defrosting function when a blocked imager condition is present.

8. The blocked imager detection system of claim 7 wherein the controller controls the heating element and is provided vehicle speed information via a speed input such that the heating element is deactivated when the controller determines that the vehicle speed falls below a speed threshold.

9. A blocked imager detection system for use in a controlled vehicle, comprising:
   an imager provided proximate a vehicle windshield and having an image sensor configured to image a scene through a viewing area of the vehicle windshield and to generate image data corresponding to the acquired images, wherein the scene is external and forward of the controlled vehicle;
   a heating element operable to perform at least one of a defogging and a defrosting function on the viewing area of the vehicle windshield;
   a temperature sensor configured to detect an operational temperature of the imager; and
   a controller configured to receive temperature information relating to the operational temperature of the imager;
   wherein when the controller determines that the operational temperature of the imager is below a temperature threshold, the controller generates a signal having an indication that the imager is blocked; and
   wherein the controller controls the heating element and is provided vehicle speed information via as speed input such that the heating element is deactivated when the controller determines that the vehicles speed falls below a speed thresholdld.

10. The blocked imager detection system of claim 9 wherein the temperature sensor comprises a diode.

11. The blocked imager detection system of claim 9 wherein the temperature sensor comprises a thermistor.

12. The blocked imager detection system of claim 9 wherein the operational temperature of the imager is determined using pixel data from the image sensor.

13. The blocked imager detection system of claim 9 wherein the signal provides a recommendation to an exterior light control system of a controlled vehicle.

14. The blocked imager detection system of claim 13, wherein the signal recommends disabling an automatic high beam control if the signal includes the indication that the imager is blocked.

15. A method for detecting a blocked imager condition, comprising the steps of:
    detecting an operational temperature of an imager configured to image a scene external and forward of the controlled vehicle and to generate image data corresponding to the acquired images;
    providing a controller with temperature information relating to the operational temperature of the imager;
    determining if the operational temperature of the imager is below a temperature threshold; and
    generating a signal having a blocked imager indication if the operational temperature of the imager is below the temperature threshold.

16. The method of claim 15, wherein a temperature sensor detects the operational temperature of the imager.

17. The method of claim 15 wherein the imager comprises an image sensor and the operational temperature of the imager is detected using pixel data from the image sensor.

18. The method of claim 15, further comprising the step of activating a heater element when a blocked imager condition is detected.

19. The method of claim 15, further comprising the step of providing the signal to an exterior light control system of a controlled vehicle as a recommendation for controlling an automatic high beam control.

* * * * *

UNITED STATES PATENT AND TRADEMARK OFFICE
CERTIFICATE OF CORRECTION

PATENT NO.        : 9,199,574 B2
APPLICATION NO.   : 14/022761
DATED             : December 1, 2015
INVENTOR(S)       : Pierce Page 1 of 1

It is certified that error appears in the above-identified patent and that said Letters Patent is hereby corrected as shown below:

Claims

Col. 12, claim 4, line 22;
    After "1" insert --,--,

Col. 12, claim 5, line 26;
    After "1" insert --,--,

Col. 12, claim 6, line 29;
    After "5" insert --,--,

Col. 12, claim 9, line 62;
    After "7" insert --,--,

Col. 12, claim 9, line 62;
    "as" should be --a--,

Col. 12, claim 9, line 65;
    "thresholdld" should be --threshold--,

Col. 12, claim 10, line 66;
    After "9" insert --,--,

Col. 13, claim 11, line 1;
    After "9" insert --,--,

Col. 13, claim 12, line 3;
    After "9" insert --,--.

Signed and Sealed this
Twenty-sixth Day of July, 2016

Michelle K. Lee
*Director of the United States Patent and Trademark Office*